US010404746B1

(12) United States Patent
O'Dell

(10) Patent No.: US 10,404,746 B1
(45) Date of Patent: Sep. 3, 2019

(54) RENDERING SPOOFED ELECTRONIC MAIL HARMLESS

(71) Applicant: Robert B O'Dell, Oakland, CO (US)

(72) Inventor: Robert B O'Dell, Oakland, CO (US)

( * ) Notice: Subject to any disclaimer, the term of this patent is extended or adjusted under 35 U.S.C. 154(b) by 0 days.

(21) Appl. No.: 15/673,401

(22) Filed: Aug. 9, 2017

(51) Int. Cl.
*H04L 29/06* (2006.01)
*H04L 12/58* (2006.01)
*H04L 9/06* (2006.01)

(52) U.S. Cl.
CPC .......... *H04L 63/1483* (2013.01); *H04L 51/28* (2013.01); *H04L 63/0428* (2013.01); *H04L 9/0618* (2013.01); *H04L 63/0435* (2013.01); *H04L 63/0442* (2013.01)

(58) Field of Classification Search
None
See application file for complete search history.

(56) References Cited

U.S. PATENT DOCUMENTS 7,263,561 B1 * 8/2007 Green .................... G06F 21/56 709/206
9,178,862 B1 * 11/2015 Daniel ................ H04L 63/0428
2005/0268330 A1 * 12/2005 Di Rienzo ................ G01S 5/14 726/4
2007/0208933 A1 * 9/2007 Sudo .................... G06Q 10/107 713/153
2009/0176518 A1 * 7/2009 Doni ...................... H04W 4/12 455/466
2009/0319781 A1 * 12/2009 Byrum ................ H04L 63/0428 713/156

* cited by examiner

*Primary Examiner* — Benjamin E Lanier

(57) ABSTRACT

An obscuration key is associated with each domain served by a group of trusted servers, and is used when sending and receiving all emails between the trusted servers. An e-mail server attempts to reverse the presumed obscuration of the body of an e-mail message prior to delivering the message to the intended recipient. If the obscuration key and method have been previously applied to the body of a message, reversal restores the body of the message such that the recipient receives precisely the message intended by the sender. If the obscuration method has not been previously applied to the content of the message, the reversal is destructive in that the body of the message is unreadable, including any URLs and URL links in the body of the message and any binary attachments to the message. Any attempt to spoof the sender without (i) use of the particular e-mail server the spoofed sender would use and (ii) authentication as the spoofed sender with that e-mail server is destructively obscured when received by the recipient. With any and all URLs and URL links in the body of the message destroyed, the recipient is prevented from reaching any harm intended by the message. With any binary attachments destroyed, the recipient is prevented from launching any malware attached to the message. Any phishing attempt resulting from the spoofing is completely thwarted.

16 Claims, 6 Drawing Sheets

626

FROM &TO ***ADDRESS PAIR* LIST** WITH ASSOCIATED KEYS 502

*FROM* *DOMAIN* LIST 504

*TO* *DOMAIN* LIST WITH ASSOCIATED KEYS 506

RENDERING SPOOFED ELECTRONIC MAIL HARMLESS

CROSS-REFERENCE TO A RELATED APPLICATION

This application claims priority of U.S. Provisional Patent Application Ser. 62/372,769 filed 9 Aug. 2016 entitled Rendering Spoofed Electronic Mail Harmless by Robert O'Dell and James D. Ivey.

FIELD OF THE INVENTION

The present invention relates generally to processing of computer data, and, more particularly, methods of and systems for verifying the source of a received e-mail message.

BACKGROUND OF THE INVENTION

A common attack on computer network security is one in which an attacker spoofs a "From:" address on an e-mail message in an attempt to trick the recipient of the message into trusting the message as authentic and, based on this misplaced trust, take action beneficial to the attacker. The success of these attacks is due not only to the usual disparity in technical skills of the attackers and their intended victims, but also to the attacker's use of a 'From' address that the victim trusts. In one attack in March 2016, a senior financial official of an American company was tricked into wiring $3 million to a bank in China on the mistaken belief that the company's new CEO had sent an e-mail to authorize the payment. Spoofing is also common in ransomware e-mail attacks.

Existing efforts to control spoofing that do not require the participation of the user include (SPF) Sender Policy Framework (created in 2003) and (DKIM) Domain Keys Identified Mail (created in 2004 by an industry consortium) And (DMARC) Domain-based Message Authentication, Reporting and Conformance (2012).

SPF encourages the registration in an accessible SPF record of just which server is authorized to send mail for a particular domain name. Servers receiving e-mail can then refer to the SPF record to verify that the mail was sent from the authorized server, rather than being forged, by comparing the domain name of the spoofer's server to the domain name shown in the 'From' line in the email. If the domain names are not the same the e-mail can be flagged prior to delivery or simply rejected, i.e. not delivered.

While the purpose of SPF is to verify that the sending server shown in the From line is actually the server from which the e-mail was sent, DKIM uses asymmetric encryption to verify that the e-mail client computer sending the e-mail is the authorized client by using a private key to encrypt the address line which is decrypted by the receiving server using a public key. The sending server also sends a hash of the message to verify that there was no tampering enroute by a third party.

The problem with these efforts was the absence of a standard way among e-mail hosts for dealing with messages failed by SPF and/or DKIM, with the result that most if not all failed messages simply went through to the recipient whether flagged as a problem or not flagged. Then Domain-based Message Authentication, Reporting and Conformance (DMARC), in 2012, set out to remedy this problem, providing a standard way for servers using SPK and/or DKIM to deal with failed messages. Users of DMARC can set their servers to choose one of three rejection policies based on information provided by SPK and DKIM: "None, Quarantine, or Reject" for mail that DMARC fails.

Yet, because of the fear of being blamed for rejecting legitimate mail, many e-mail hosts who use DMARC are loath to set a policy of Reject or even Quarantine. And some e-mail hosts simply avoid SPK, DKIM and DMARC, saying that it creates other problems for them, as well.

SPF, DKIM and DMARC are efforts to create a standard system to eliminate spoofing by gathering and using data from abuse found anywhere on the internet. It is a helpful but complex effort that requires significant internet traffic, requires continued careful attention to detail by email hosts but has yet to conquer the problem. Recently, a Wikipedia article on spoofing estimated that the effectiveness of efforts to identify spoofing vary from 8% to almost half of spoofed messages.

Much of the reason that e-mail hosts have not all embraced SPF, DKIM and/or DMARC is not technology but the human factor. First many systems administrators at e-mail hosts find these efforts very complicated and difficult to troubleshoot. And some are loath to depend on these methods because they think these methods will interfere with their own management of their servers and create problems in their relations with their clients. Even if an e-mail host does use any or all of these internet-wide efforts to stop abuse, many such hosts simply flag the mail and send it on to the client—preferring what is called a 'soft block' rather than a 'hard block' (outright rejection) of failed messages in order to avoid blame for any wrongly blocked messages.

While clearly helpful in attacking the spoofing problem by their focus on identifying the abusers and stopping them from sending spoofed mail, these efforts do little to prevent harm from those messages that do reach the intended recipient. And, has been shown by ransomware attacks in recent months, a great deal of harm and fear can be done too quickly for these methods to control. What is needed is a locally applied method that will stop new attacks without any need for alteration, will be easily understood and managed by e-mail server administrators, and allow them to deliver every e-mail message to the intended recipient while preventing a recipient response to the text, links and attachments in a spoofed message. This would relieve the email host from the fear of complaints about blocking of messages and also be a powerful means of reducing the harm from spoofing, including ransomware spoofing. It would provide a powerful complement to existing efforts.

SUMMARY OF THE INVENTION

In accordance with the present invention, the spoofer is taken at his word. The 'From' line is assumed by the receiving server to actually be the source of every email received whether spoofed or not. In accordance with the invention, this presumption of innocence by the receiving server results in a spoofed email which only appears to be from a trusted source being rendered unintelligible when received by the intended recipient without requiring anything of the recipient or of the administrators of the receiving server. The recipient of such spoofed messages easily recognizes each of them as spoofed and also is protected from any intended harm. Messages that have not been spoofed are unaffected. The invention does not depend on harm being done before it is useful.

Treating spoofed and non-spoofed messages differently is the result of the sending server obscuring in a reversible manner the body of each email it sends to its own clients and to one or more clients of trusted cooperating servers, and attempting to reverse the presumed obscuration of the body of each email it receives which appears to have been sent by itself or by a trusted cooperating server. The attempted reversal of the body of an email that was previously obscured—i.e. any email apparently sent from a domain served by the receiving server or a trusted cooperating server—will be restored so that the recipient will see it exactly as it was sent. The attempted reversal of the obscuration of the body of any email apparently sent by the receiving server or by a trusted cooperating server that was NOT obscured when sent—i.e. a spoofed message—will be obscured by the effort to remove the presumed obscuration, leaving its text unreadable and any links and attachments both unintelligible and unusable.

In the preferred embodiment, symmetric encryption is the method used to obscure the body of the email and to reverse the presumed obscuration of the body of the email. The 'From' and 'To' Address lines of the email are unaffected by the encryption of the body of the email. The body of the email is encrypted using a key associated with the pair of 'From' and 'To' Address lines indicating the sender of the email and the intended recipient of the email. The body of the email received from the client by the sending server will, currently, with all non-automated email, be the result of MIME Base64 (or an equivalent 6-bit ASCII) encoding by the client's email program. This encoding will represent as 6-bit ASCII all of the text in whatever language used in the text, as well as audio, video and still images in the body of the email. This encoding requires nothing of the person sending the email; it is completed by the client's email program. When such encoding is employed—as it normally is—what is received by the receiving server using the present invention is an encryption of the 6 bit ASCII email representation of the email body. After decryption of the 6 bit ASCII encrypted representation of the body of the email, the email, once again the 6 bit ASCII representation of the email as originally prepared by the person originating the email, is delivered to the intended recipient whose email program can now decode it so as to make it appear exactly as originally prepared. In another embodiment, obscuration of the body of the email is accomplished by asymmetric encryption. And, in another embodiment, obscuration is done by encoding the body of an email using a Caesar cipher.

A trusted cooperating server in accordance with the present invention is a server which sends emails only from clients who are required to use strong authentication to enter the server's mail application, and a server which carefully secures the keys it shares with other trusted servers. The trusted cooperating servers are servers that also appear to one or more recipients of email to be a trusted source of email.

Each trusted server keeps a list of domain pairs and full address pairs. A 'domain pair' is simply any two email addresses whose domains share an encryption key. The list of these domain pairs can include addresses with the same domain or with different domains. Each domain pair has an associated key which is used to encrypt and decrypt the body of email messages sent from one domain to the other domain of the domain pair, which is served either by the same server or by a different server. Each trusted server will serve at least one domain and therefore have at least one domain with which to share a key with any of the many domains served by the mail servers on the internet. The key need not be unique to a domain pair; it can be shared among several domain pairs, even shared by all the domains served by a particular server. A 'full address pair' is two email addresses wherein the complete addresses—not just the addresses domains—share an encryption key. Each pair of full addresses has an associated key which is used to encrypt and decrypt the body of email messages sent from one full address on the server to another full address on the same server or on a different server. A key associated with a full address pair can be unique to the pair or it can be shared among several full address pairs, including addresses on a contact list.

A BRIEF DESCRIPTION OF THE DRAWINGS

DETAILED DESCRIPTION OF THE INVENTION

Figure 1:
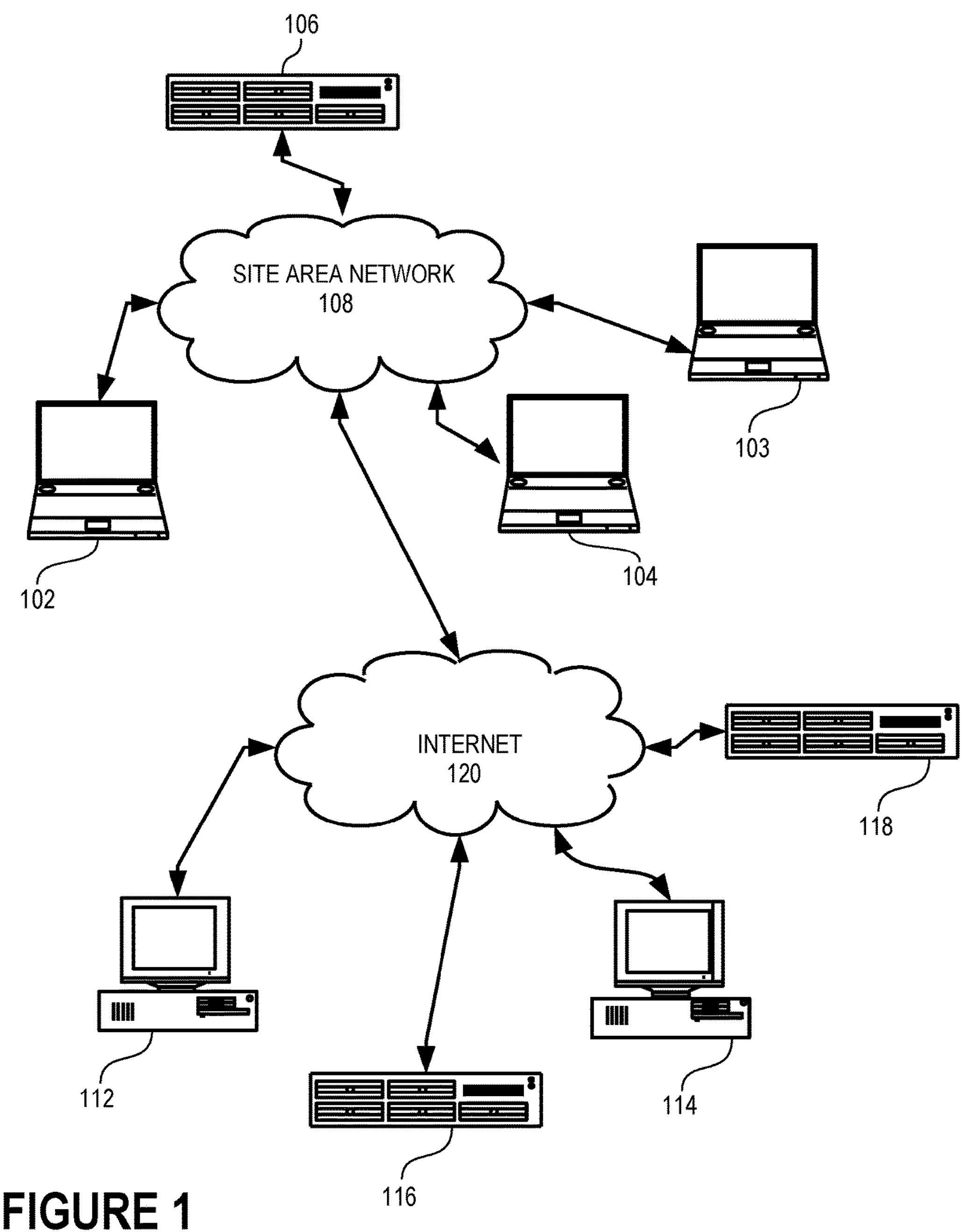
FIG. 1 is a block diagram showing spoofed and non-spoofed electronic messages sent through the internet in accordance with the invention.
Figure 6:
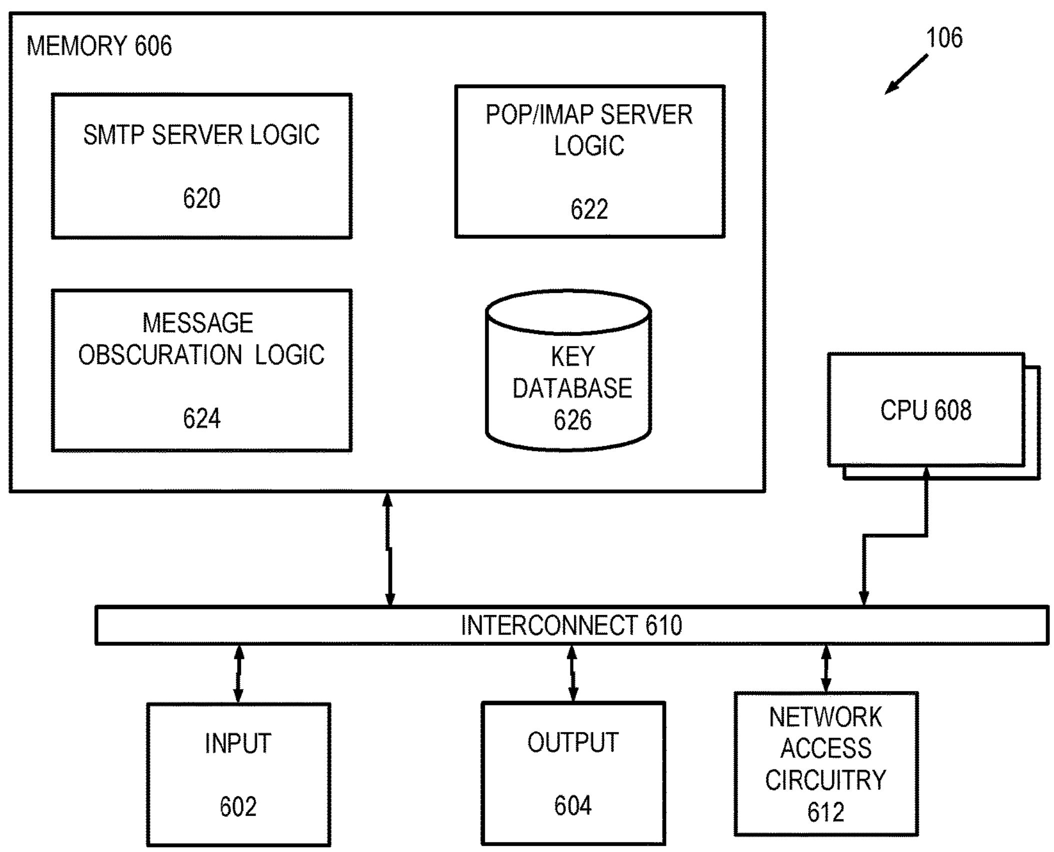
FIG. 6 is a block diagram of an e-mail server configured to render a spoofed electronic message unintelligible in accordance with the invention.

In accordance with the present invention, Mail Server 106 in FIG. 1 sends and receives email messages for Site Area Network 108 for client computers 102, 103 and 104 using internet 120. Server 106 is a server that can be dedicated for use only with a single domain name or it can serve many different domain names, and can include multiple physical servers rather than a single piece of hardware. As shown in FIG. 6, Server 106 includes Memory 606 which allows the server to transmit mail using SMTP Server Logic 620 (Simple Mail Transport Protocol); make received email available to its client computers using Internet Message Access Protocol (IMAP) Server Logic or POP Server Logic in 622; store domain pairs and address pairs and their associated obscuration keys in Key Database 626, and use Message Obscuration Logic 624 to determine whether the servers in the 'From and To' lines of the email share an address pair or a domain pair, and if so to obscure or attempt to de-obscure the body of the message using a key from Key Database 626. Server 106 also includes CPU 608, Input means 602, Output means 604, Network Access Circuitry 612 and interconnect 610. Client computers 112 and 114 are not served by mail server 106 and are not part of Site Network 108. Client 112 is a client of Server 116. Client 114 is a client of Server 118.

In accordance with the present invention an email server obscures the body of each email it sends to each of the one or more domains it serves; the obscuration of the body of the email includes the obscuration of text and any links and attachments. When receiving an email which has a 'From' line indicating it was sent by that same server, i.e. the server receiving it, the receiving server presumes that the body of the email was obscured when sent and attempts to remove the presumed obscuration by reversing the obscuration before delivery. If the email was actually sent from that server the obscuration will be removed and the email will be delivered to the intended recipient exactly as sent. But if the From line of the email was spoofed, meaning that the email was not sent from the address in the From line, the body of the email was NOT obscured when sent and the attempt to remove the presumed obscuration prior to the delivery of the email to the intended recipient will render the body of the email unintelligible, leaving text unreadable and links and attachments both illegible and unusable. It is then not only clear to the recipient that the email was spoofed, but the recipient is also protected from harm.

The same process is used with groups of two or more trusted cooperating servers. An obscuration key is associated with each domain served by the group of trusted servers, and is used when sending and receiving all emails between the trusted servers. All email within the group is expected to be obscured when sent and therefore needs to have the obscuration reversed before delivery to the indeed recipient. Since the body of a spoofed email will not be obscured when sent the body of the spoofed email will then be rendered unintelligible by the receiving server's attempt to reverse the presumed obscuration.

Obscuring an email and removing the obscuration are both done using obscuration keys, which are associated with lists relating to trusted cooperating servers. Key Database 624 has two lists, one of email Address Pairs 502—the full addresses seen on From lines and To lines in emails—and another of Domain Pairs 504, just the domains found in the addresses seen on the From and To lines of emails. Each pair has an obscuration key associated with it, which is used to obscure the body of any email where the pair of Domains or Addresses found in the From and To lines have a match in the appropriate pair list. Domain pairs on the 504 list are the result of agreement between cooperating trusted servers, each server of which serves one of the domains in the domain pair. One pair of domains on the Domain Pair list are identical domains; this is done for each domain served by a server to be sure that spoofers sending emails ostensibly from the same domain will be rendered harmless. Address pairs are sometimes assigned by the server, but also can be requested by clients of the server; some clients might want to use address pairs for their contact list, for example. Address pairs are searched before domain pairs in the preferred embodiment when the server is either sending or receiving an email.

For example, if one trusted cooperating server serves email to only one domain—2mail.com—and another serves email to only one domain—3mail.com—they can share the domain pair "2mail.com&3mail.com" and its obscuration key; each server can then avoid spoofed emails with the domain name of the other server in the From line by using the obscuration key to obscure each email it sends to the other server, and using the same obscuration key to attempt to de-obscure—reverse the obscuration—of every email it receives from the other server. In this example where each server serves only a single domain, the 'From and To' list relating to the two domain pairs is, for one of them, "2mail.com & 2mail.com" (the domain pairs relating entirely to the clients served by that single domain) and "2mail.com & 3mail.com" (the domain pair shared with the other server, which serves only the domain 3mail.com. For the other server the domain pair list is 3mail.com & 3mail.com and 2mail.com& 3mail.com. In this example of two trusted cooperating servers, each of which serve only a single domain only two entries on the domain pair list, one relating to the server itself and the other to the trusted cooperating server. If either or both servers serve more than one domain, they can choose to share more than one pair of 'From & To' domains.

In the servers in the immediately preceding example above relating to domain pairs, one complete email address is alpha@2mail.com, the address of a client of the server which serves the domain 2mail.com. Another complete address is beta@3mail.com, the address of a client of the server that serves the domain 3mail.com. The two clients beta@3mail.com and alpha@2mail.com can choose to have their complete addresses stored as address pairs. In the preferred embodiment address pairs have a key associated with the address pair or with a group of address, including those from an email contact list.

The memory of each trusted cooperating server in this preferred embodiment includes identical versions of message obscuration logic 624. If server 106 serves only a single domain, the Domain Pair List is a list of the domains of trusted cooperating servers paired with the domain served by server 106. If server 106 serves more than one domain, the Domain Pair List 504 includes more than one list, each list being a list of the domains of trusted cooperating servers paired with each domain served by server 106 to which the cooperating server sends email or from which it receives email. In this preferred embodiment each domain pair in the Domain Pair list 504 has a different obscuration key associated with it, i.e. a key is unique to each domain pair; and the keys are changed frequently. In other embodiments, server 106 associates the same obscuration key with all of the trusted servers with which it cooperates. In yet another embodiment, server 106 associates the same obscuration key with more than one but not all of the trusted servers with which it cooperates. In one more embodiment, where server 106 serves more than a single domain, the domain pair list is constructed so that server 106 uses only a single list of domain pairs, associating the same key with a trusted cooperating server, regardless of the domain served by server 106.

In another embodiment, there are three lists with associated keys in key database 624: an Address Pair list, a From list and a To list. The Address is the same as in the preferred embodiment—a list of pairs of full addresses. The From list is a list of the domains served by trusted cooperating servers; there is no associated key. The To list in this other embodiment is simply a list of the domains of the trusted cooperating servers with the associated keys; when one server sends an email to another it obscures the email body with the appropriate To key from the To key list. When it receives an email it reverses the presumed obscuration of the email body by using the key associated with the domain it serves and to which the email is addressed.

Figure 2:
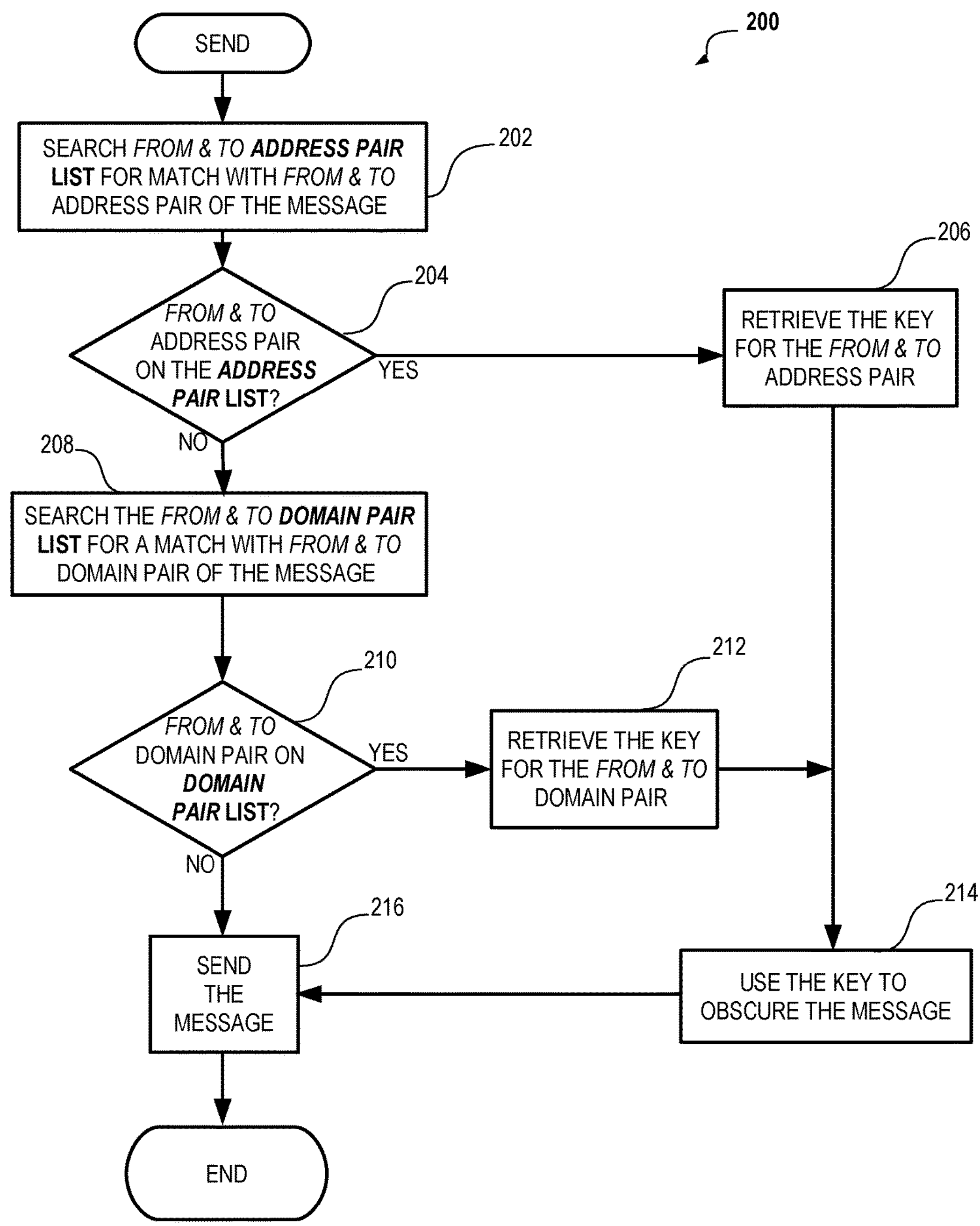
FIG. 2 is a logic flow diagram illustrating the sending of an electronic message through the internet in accordance with the invention.

An Illustration of Sending an Email Between Two Trusted Cooperating Servers Using the Preferred Embodiment Client 102 at 102@2mail.com asks mail server 106 to send an email to client 112 at 114@anotherserver.com which is served by mail server 116. Before sending the email, server 106 subjects the email message to message obscuration logic 624 as seen in FIG. 2.

In step 202 server 106 notes the full address pair of the email, 102@2mail.com and 114@anotherserver.com on the From line and on the To line and searches the Address Pair List 502 in Key Database 626 for a match with these full addresses. After the search is complete and finding no matches in step 204, the process moves to step 208 to search Domain Pair list 504 for a match with the domain pair 2mail.com and anotherserver.com in the From and To lines of the email. Had no match been found in step 210, the process would have moved to step 216 and the message would have been sent on the intended recipient without any effort to decrypt it, since with no address pair match and no domain pair match, there was no evidence that decryption was needed and therefore no evidence of an attempt to send a spoofing email. But a match was found in step 210, so the process moved to step 212 where server 106 retrieves the encryption key in 504 associated with the pair of domains 2mail.com and anotherserver.com.

The next step in the process is then step 214 wherein the body of the email is obscured. But first it may be helpful to explain that what will be obscured in this illustration of the preferred embodiment is not the body of the email, but an altered version of the body of the email. The body of the email is simply some text that reads "In 日本". This is the English word "In' in ASCII followed by the Japanese Kanji characters for "Japan".

Both legitimate emails and spoofed emails can include not only ASCII text but non-ASCII characters—including the Japanese Kanji characters for the word Japan(日本) used in the email message of this illustration of the preferred embodiment—audio, video and still images including JPEGs. UTF-8 can accommodate them all. But, since only ASCII characters are assumed to be reliably transmitted everywhere on the internet, today's email software alters automatically the body of any email the client asks to be sent so as to make it possible for the server to transmit the body using only ASCII characters.

UTF-8 is by far the most widely used character encoding on the internet. In this illustration of the sending of emails using the preferred embodiment of the present invention client computers 102, 103, 104, 112 and 114 as well as Servers 106, 116 and 118 all communicate with each other and with the internet using UTF-8 character encoding.

Virtually all non-automated email, i. e. email sent by individuals, is said to use Multipurpose Internet Mail Extensions (MIME) Base64 to alter UTF-8 characters in the body of an email so that they are represented during transmission as 6-bit ASCII characters—a character set of 64 characters, shown below. MIME is an Internet standard that extends the format of email to support text in character sets other than ASCII and in non-text attachments including audio, video, and still images.

Conventionally, the Base64 representation of the body of the email is sent to the intended recipient's server and the 6-bit ASCII encoding reversed by the recipient's email software when delivered, whereupon it appears exactly as it appeared to the client of the sending server prior to the client's email program asking the sending server to send it. But in accordance with the present invention, the 6-bit ASCII encoded version of the email body is obscured by the sending server before being sent to the server indicated on the 'To' line of the email. The method of obscuration in the preferred embodiment is symmetric encryption. In another embodiment the method of obscuration is asymmetric encryption, and in another is simply Caesar cipher encoding. Almost any obscuration method is useful so long as the key is kept secure.

Resuming the process of sending the email from 102@2mail.com to 114@anotherserver.com, at step 212 of FIG. 2: In step 212 e-mail server 106 retrieves an encryption key for encrypting the body of the email message. In this illustrative embodiment, an encryption key is retrieved from Domain Pair List 504 in step 212. The key is associated with the domain pair in the 'From & To' lines of the e-mail message, 2mail.com and anotherserver.com.

Figure 4:
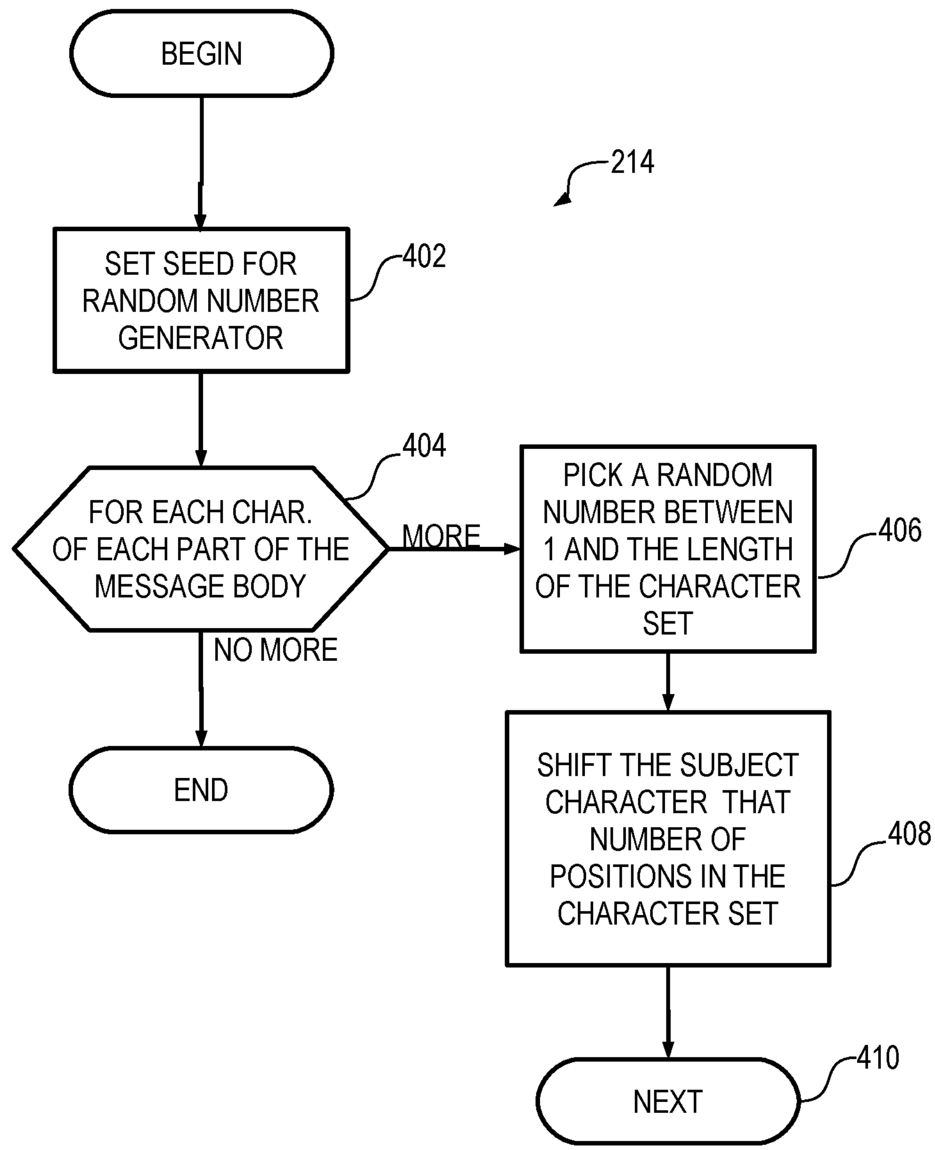
FIG. 4 is a logic flow diagram illustrating obscuration and reversal of obscuration of a message in accordance with the invention.
Figure 5:
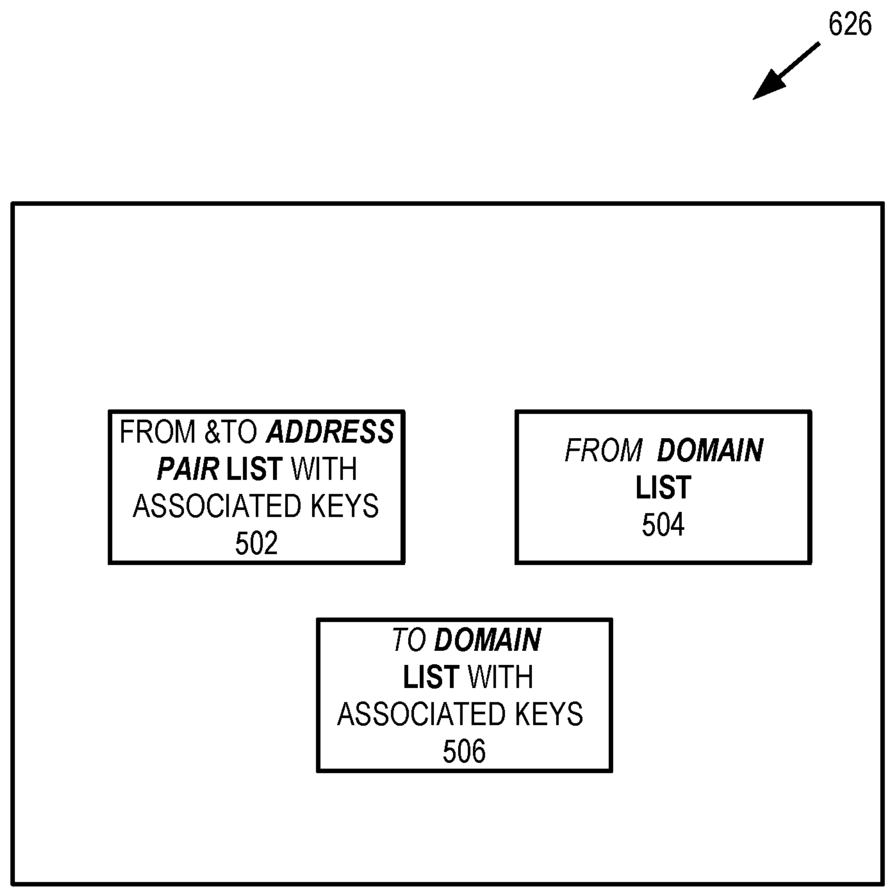
FIG. 5 is a block diagram showing lists of domain pairs and full address pairs used when obscuring and de-obscuring the body of a message in accordance with the invention.

Encryption step 214 of FIG. 2 is shown in detail in FIG. 4. In step 402 server 106 sets the seed for a pseudo-random number generator. In this illustrative embodiment, the seed is a cryptographic digest of a cryptographic digest of the key that is converted to a numerical value. Setting the seed according to the key makes the series of pseudo-random numbers generated and used in processing according to logic flow diagram 214 as shown in detail FIG. 4 repeatable and therefore enables reversal of the encryption using the same key, as described more completely below.

Loop step 404 and next step 410 define a loop in which e-mail server 106 processes each character of each body part of the message according to steps 406-408 until all characters of all body parts of the message have been processed according to the loop of steps 404-410. During an iteration of the loop of steps 404-410, the particular character processed is sometimes referred to as the subject character.

In step 406, e-mail server 106 picks a pseudo-random number between one (1) and the length of a character set representing the various 64 characters of 6-bit Base64 ASCII that can be part of a body of an e-mail message, using a number of those generated by the pseudo random number generator whose seed was set in step 402. The number represents an offset within the character set by which the subject character is translated. Where the pseudorandom number picked is large enough to translate a character past the end of the sequence of 64 characters, the process rounds to the beginning of the sequence and continues counting The Base64 characters and their sequence as used in this encryption example: ABCDEFGHIJKLMNOPQRSTUVWXYZabcdefghijklmnopqrstuvwxyz0123456789+/=

In step 408 and using the number determined in step 406, e-mail server 106 translates the subject character accordingly. It is helpful to consider an example. Suppose that the body of the email as composed by the user included "In 日本" using the Kanji characters for the word Japan, which are preceded by the English word "In". In the email request to the sending server 106 the "In 日本" reads SW4g5pel5pys, after 6-bit Base64 encoding by the client's software. The character set used for encoding is the 64 character sequence of 6-bit Base64 ASCII shown above and the (consecutive) characters to be obscured are in accordance with the invention before sending the email to the receiving server are SW4g5pel5pys. 6-bit Base64 ASCII has 64 characters, so e-mail server 106 would pick pseudo-random numbers between 1 and 64, which in this illustrative example are 3,22,14,7,31,8,16,1,13,20,55,4.

E-mail server 106 continues processing in the manner described above until the entirety of all body parts of the e-mail message have been processed according to the loop of steps 404-410, upon which processing according to logic flow diagram 214 as shown in detail in FIG. 4 completes Using the consecutive pseudorandom numbers 3,22,14,7, 31,8,16,1,13,20,55,4 and a sequence of 6-bit ASCII characters ABCDEFGHIJKLMNOPQRSTUVWXYZabcdefghijklmnopqrstuvwxyz0123456789+/- - - - - - - - - - to obscure (step 214) the consecutive characters 'SW4g5pel5pys' created from the UTF-8 characters of the body of the message "In 日本" by the email software of 102@2mail.com. E-mail server 106 translates "S" a distance of three (3) characters, i.e., to "V"; translates "W" 22 characters to the character "r"; translates the character "4" 14 characters (rounding at the end of the 6-bit ASCII character set back to the character A at the beginning) to "G"; translates the character “g” 7 characters to “n”; translates the character “5” 31 characters to “Y”; translates the character “p” 8 characters to “x”; translates the character “e” 16 characters to “m”; translates the character “1” 1 character to “2”; translates “5” 13 characters to “F”; translates “p” 20 character spaces to “9”; translates the character “y” 55 spaces to “p”; and translates the character “s” 4 spaces to “w”. As a result of the encryption, the message ‘SW4g5pel5pys’ is now ‘VrGnYxm2F9pw’. Now that step 14 of FIG. 2 is complete, the process moves to step 216 and the email message, including the encrypted email body, ‘VrGnYxm2F9pw’ is sent from server 106 to server 116.

Figure 3:
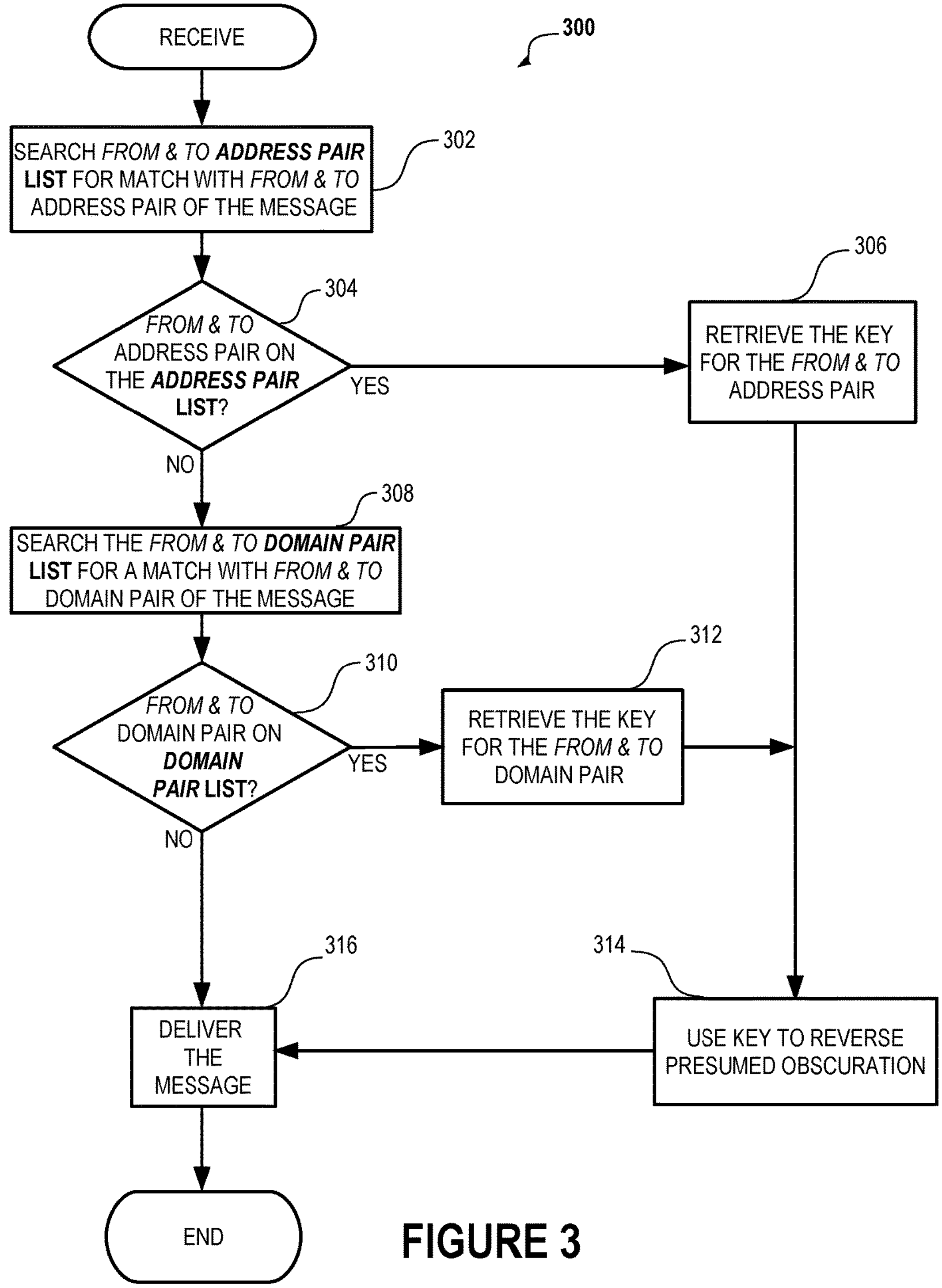
FIG. 3 is a logic flow diagram illustrating receipt of a message sent through the internet in accordance with the invention.

When server 116 receives the email for client 112@anotherserver.com, from 102@2mail.com, server 116 subjects the email to the receiving email process shown in FIG. 3, starting with step 302, wherein the server searches Address Pair List 502 for a match with the address pairs found on the From and To lines of the email, 112@anotherserver.com, and 102@2mail.com. Had an Address Pair match been found in Address Pair List 502 at step 304, the process would have moved to step 306 where the key associated with the Address would have been retrieved. But no match for the Address pair in the From and To lines of the received email was found in Address Pair List 502, so a search of the Domain Pairs List 504 is made in step 308 to find a match with the domain pairs of the From and To lines of the email received from trusted cooperating server 106. If the result of the search of the Domain Pair list in 504 for a match with the domain pair of the received email is found to be negative in step 310, the process would move to step 316 where the email message would simply be delivered as is to the intended recipient. But a domain pair match is found in step 310 and the process moves to step 312 wherein the obscuration key associated with the domain pair of the received email is retrieved and the process moves to step 314 wherein the key is used to reverse the presumed obscuration of the received email by reversing the encryption process.

Decrypting a Legitimate (Non-Spoofed) Message

In reversing obscuration resulting from symmetric encryption of the received email in step 314, receiving email server 116—except for translating each subject character in the opposite direction—uses the same process seen in FIG. 4 that was used to encrypt the email. Due to the same seeding of the cryptographic pseudo-random number generator in step 402, the sequence of pseudo-random numbers picked in repeated performances of step 406 in reversing obscuration is exactly the same sequence of numbers picked in repeated performances of step 406 during encryption. The email message received by server 106 was VrGnYxm2F9pw’. During the attempted reversal, “V” is translated backwards 3 spaces to S, “r” is translated backwards 22 spaces to “W”, and so forth until the character string ‘SW4g5pel5pys’ is restored, and then delivered in step 316 to the intended recipient, whose email software decodes ‘SW4g5pel5pys’ using MIME Base64 encoding to read “In 日本”, in UTF-8, the body of the message just as it was composed by client 102 of server 106.

Applying Decryption to a Spoofed Message

But if we suppose that the same email had been sent not by trusted cooperating server 106 which shared a domain pair encryption key with server 116, but was instead a spoofed email sent to 102 @2mail.com for client 114 by server 118. Server 118, unlike server 106, does not share the needed domain pair encryption key with server 116, so the intended recipient, client 102, will receive an email whose body is unintelligible. Had the same email message been sent as a spoofed email, that is to say was not sent by the address seen on the From line, the UTF-8 message to be sent by the spoofer’s sending server 118 to the same address in the To line of 102@2mail.com would, like legitimate (non-spoofed) emails, have been encoded by the spoofer’s email software using MIME 6-bit Base 64 encoding and would have been just the same as that given to the email server 10 by client 102, which was the 6-bit Base64 ASCII encoding ‘SW4g5pel5pys’ of the UTF-8 email message. But mail server 118 of spoofer client 114 would have sent the email to the recipient’s receiving server 106 without the encryption since the spoofer’s sending server, server 118 has no encryption key for encrypting a message with the From and To domain pairs seen in the email, and so simply sends it on. When the message is received by the receiving server 106, receiving server 106 takes the spoofer at his word—i.e. that the message is actually from 112@anotherserver.com—and, so, assumes that the message has been encrypted with the shared key associated with the email’s From and To lines and attempts to use that key to decrypt the message prior to delivery.

Decrypting ‘SW4g5pel5pys’ means reversing a presumed translation of each of the characters that would have occurred during encryption. But since the characters in ‘SW4g5pel5pys’ have not been translated by the presumed encryption process, the result delivered to the intended recipient is not ‘SW4g5pel5pys’, the appropriate 6-bit Base 64 ASCII encoding of the UTF-8 email message (In 日本). Instead, after an attempted decryption by server 116 using the shared key indicated by the From and To lines on the email, the message delivered to client 112 is ‘PBqZbkW0tW8o.’ And when ‘PBqZbkW0tW8o’ is decoded to UTF-8 by the recipient’s email software using 6-bit MIME Base64 encoding, the spoofed message delivered in step 316 to the intended recipient client 102 is not “In 日本” but instead is <™nE'µo(.

E-mail servers 106, 116, and 118 are each a computing device configured to serve e-mail delivery tasks. The description of e-mail server 106 is equally applicable to e-mail servers 116 and 118 except as otherwise noted herein. E-mail server 106 is shown in greater detail in FIG. 6 and includes one or more microprocessors 608 (collectively referred to as CPU 608) that retrieve data and/or instructions from memory 606 and execute retrieved instructions in a conventional manner. Memory 606 can include generally any tangible computer readable media such as persistent memory such as magnetic and/or optical disks, ROM, and PROM and volatile memory such as RAM.

CPU 608 and memory 606 are connected to one another through a conventional interconnect 610, which is a bus in this illustrative embodiment and which connects CPU 608 and memory 606 to one or more input devices 602 and/or output devices 604 and network access circuitry 612. Input devices 802 detect physical manipulation by a human user and generates signals in response thereto and can include, for example, a keyboard, a keypad, a touch-sensitive screen, a mouse, a microphone. Output devices 604 can include a display—such as a liquid crystal display (LCD)—and one or more loudspeakers. As a server, e-mail server 106 can exclude input devices 602 and output devices 604. Network access circuitry 612 sends and receives text data through a wide area network such as the Internet and/or mobile device data networks.

A number of components of e-mail server 106 are stored in memory 606. In particular, SMTP server logic 620, POP/IMAP server logic 622, and message obscuration logic 624 are each all or part of one or more computer processes executing within CPU 608 from memory 606 in this illustrative embodiment but can also be implemented using digital logic circuitry. As used herein, "logic" refers to (i) logic implemented as computer instructions and/or data within one or more computer processes and/or (ii) logic implemented in electronic circuitry. SMTP server logic 620 sends e-mail messages using message obscuration logic 624 to obscure messages in the manner described above. POP/IMAP server logic 622 processes received e-mail messages using message obscuration logic 624 to reverse obscuration of messages in the manner described above.

Key database 626 stores one or more keys used by e-mail server 106 in obscuring and reversing obscuration of messages in memory 606. In this illustrative embodiment, key database 626 is organized as one or more databases, including both Address Pairs and Domain pairs and their associated keys.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A computer-implemented method wherein an electronic message falsely claiming to be from the address shown as that of the sender is rendered unintelligible before delivery to the intended recipient, the method comprising:

receiving, at a server, a plurality of electronic messages that include a source address and a destination address, wherein the source address and the destination address each include a domain name;

identifying, at the server for each received electronic message, the domain name from the source address and the destination address as an address pair, and their domain names as a domain pair;

obtaining, at the server, an obscuration key for each received electronic message by utilizing the identified address pair, and their identified domain names as a domain pair;

performing, at the server, reversal of an obscuration method on each received electronic message using the obtained obscuration key for each electronic message;

sending, by the server, each electronic message to a client device corresponding to the destination address after reversal of the obscuration method has been performed; and allowing display of the body of the received electronic message, on the client device.

2. The method of claim 1 wherein the obscuration method is encryption.

3. The method of claim 1 wherein obscuration includes replacing characters of the original message by 6-bit ASCII characters.

4. A non-transitory computer readable medium useful in association with a computer which includes one or more processors and a memory, the computer readable medium including computer instructions which are configured to cause the computer, by execution of the computer instructions in the one more processors from the memory, an electronic message falsely claiming to be from the address shown as that of the sender is rendered unintelligible before delivery to the intended recipient, by at least:

receiving, at a server, a plurality of electronic messages that include a source address and a destination address, wherein the source address and the destination address each include a domain name;

identifying, at the server for each received electronic message, the domain name from the source address and the destination address as an address pair, and their domain names as a domain pair;

obtaining, at the server, an obscuration key for each received electronic message by utilizing the identified address pair, and their identified domain names as a domain pair;

performing, at the server, reversal of an obscuration method on each received electronic message using the obtained obscuration key for each electronic message;

sending, by the server, each electronic message to a client device corresponding to the destination address after reversal of the obscuration method has been performed; and allowing display of the body of the received electronic message, on the client device.

5. A computer system comprising:

at least one processor;

a computer readable medium that is operatively coupled to the processor; and spoofing verification logic (i) that executes in the processor from the computer readable medium and (ii) that, when executed by the processor, causes the computer to render an electronic message falsely claiming to be from the address shown as that of the sender unintelligible before delivery to the intended recipient by at least:

receiving, at a server, a plurality of electronic messages that include a source address and a destination address, wherein the source address and the destination address each include a domain name;

identifying, at the server for each received electronic message, the domain name from the source address and the destination address as an address pair, and their domain names as a domain pair;

obtaining, at the server, an obscuration key for each received electronic message by utilizing the identified address pair, and their identified domain names as a domain pair;

performing, at the server, reversal of an obscuration method on each received electronic message using the obtained obscuration key for each electronic message;

sending, by the server, each electronic message to a client device corresponding to the destination address after reversal of the obscuration method has been performed; and allowing display of the body of the received electronic message, on the client device.

6. The method of claim 1 wherein an electronic mail server shares the obscuration method and keys with at least one other server.

7. The method of claim 1 wherein the body of the electronic message is obscured with the obscuration method and key associated with the source address in the FROM line served by a sending server, and the reversal by a receiving server is made using the obscuration method and key associated with the source address in the FROM line.

8. The method of claim 1 wherein the body of the electronic message is obscured by a sender server with the obscuration method and key associated with the address in the TO line served by a receiving server, and the reversal by the receiving server is made using the obscuration method and key associated with the destination address in the TO line.

9. The method of claim 1 wherein the obscuration method and key are associated with at least one domain name pair.

10. The method of claim 1 wherein the obscuration key used to reverse obscuration in an electronic message has been provided previously to a receiving server by a sending server.

11. The method of claim 1 wherein the obscuration key used to reverse obscuration in an electronic message has been provided previously to a sender server by a receiving server.

12. The method of claim 1 wherein the identified address pair is utilized before the identified domain name pair at a receiving server to obtain the obscuration key.

13. The method of claim 1 wherein the identified domain pair is utilized at a receiving server to obtain the obscuration key used by a sender of the electronic message only after no obscuration key is found for the identified address pair.

14. The method of claim 1 wherein the utilization of both the identified address pair and the identified domain pair fail to obtain an obscuration key, the received electronic message is delivered to the client device corresponding to the destination address.

15. The method of claim 1 wherein the obscuration key for an address pair is available only when a complete source address and a complete destination address pair match and address pair on a receiving server.

16. The method of claim 1 wherein the obscuration key for a domain pair is available only when the domains of the source and destination addresses match a domain pair on a receiving server.

* * * * *